J. G. MOOMY.
TIRE PATCH AND THE PROCESS OF MAKING THE SAME.
APPLICATION FILED SEPT. 2, 1916.
1,211,867.
Patented Jan. 9, 1917.
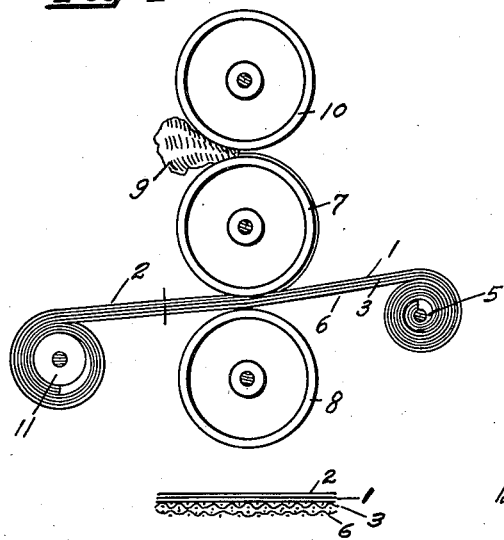
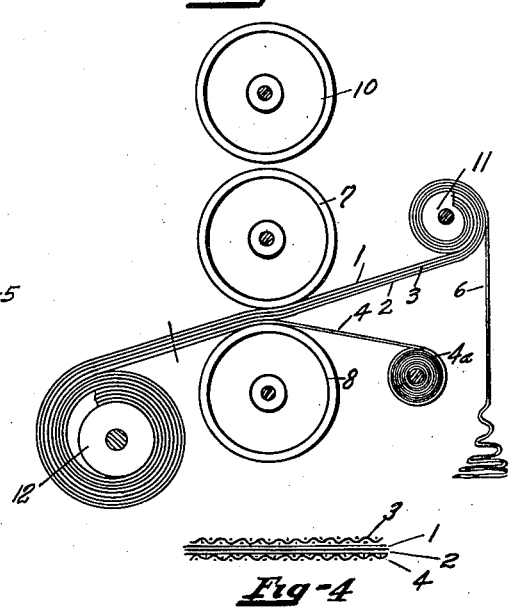
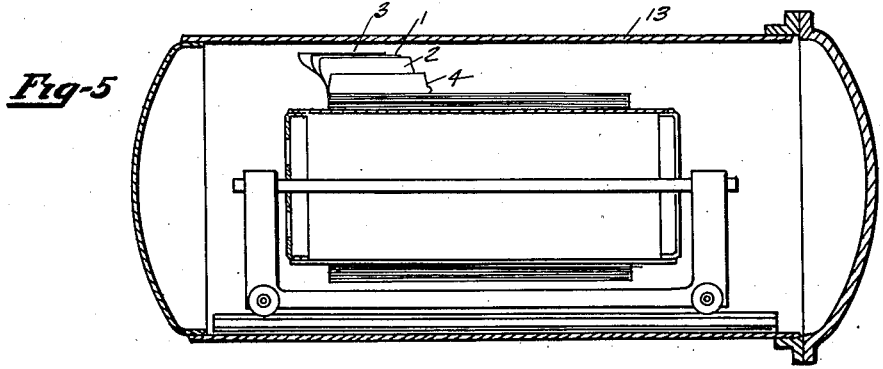
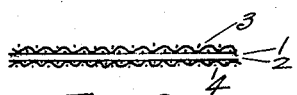
Inventor
Joseph G. Moomy
By
Attorney

UNITED STATES PATENT OFFICE.

JOSEPH G. MOOMY, OF ERIE, PENNSYLVANIA.

TIRE-PATCH AND THE PROCESS OF MAKING THE SAME.

1,211,867.   Specification of Letters Patent.   Patented Jan. 9, 1917.

Application filed September 2, 1916. Serial No. 118,216.

*To all whom it may concern:*

Be it known that I, JOSEPH G. MOOMY, a citizen of the United States, residing at Erie, in the county of Erie and State of Pennsylvania, have invented new and useful Improvements in Tire-Patches and the Processes of Making the Same, of which the following is a specification.

This invention relates to tire patches and the process of making the same and consists in certain improvements therein as will be hereinafter fully described and pointed out in the claims.

With some tire patches it is desirable to have the patch of sufficient strength to support some of the inflation strain. This is particularly true where the patch is used on a tube under broken parts of a shoe. It is desirable to have a patch in which the gummed face will readily and firmly adhere to a surface such as a tube and which has a backing which will hold the patch in shape.

In carrying out my invention I form the gummed face of raw rubber, thus assuring a ready attachment to the surface of the tube. I secure to this layer of raw rubber a layer of vulcanized rubber. This is done during the vulcanization so that there is a complete union between the layers. I secure to the backing of the vulcanized layer a reinforcing fabric. This is permanently secured to the vulcanized layer during vulcanization. I secure to the face of the gummed fabric a facing of fabric, preferably glazed fabric, which can be detached from said surface and which retains this surface in its fresh state.

I have illustrated my invention in the accompanying drawings as follows:—

Figure 1 shows a side elevation, in detail, of the mechanism for assembling the layers. Fig. 2 a side elevation in outline indicating the second step in the assembling of the layers. Fig. 3 a section of the layers as assembled in Fig. 1. Fig. 4 a section of the layers as assembled in Fig. 2. Fig. 5 a section of a vulcanizing drum showing the material as it is vulcanized. Fig. 6 a section of the completed fabric.

1 marks the vulcanized layer, 2 the non-vulcanized layer, 3 a reinforcing fabric on the vulcanized layer and 4 a facing preferably of glazed fabric on the non-vulcanized layer.

In forming the material I run the fabric 3 on the vulcanized layer 1 and run the fabric 6 in the roll to prevent the adhesion of the vulcanizing stock with the preceding layers of fabric 3. These are conveniently run into a roll 5. From this they are run through the calendars 7 and 8 and a layer of non-vulcanizing stock 9 is fed through the calendars formed by the rolls 7 and 10 and between the calendars 7 and 8, thus forming a material with the two layers of rubber and the supporting fabric. This is carried onto a roll 11. The fabric is then run off the roll 11 between the calendars 7 and 8 and the fabric 6 which has been run in temporarily is withdrawn as the material is rolled off. A glazed fabric 4 is run in from a roll 4ᵃ and the completed layers 1, 2, 3 and 4 are carried onto the drum 12. The fabric as it is wound on this drum is in shape for vulcanization, the layers themselves forming part of the winding for the vulcanizing, the supporting fabric being especially effective for this purpose. At the completion of the winding the end of the glazed fabric is cut slightly shorter than the other layers, thus exposing a slight strip of the non-vulcanized layer 2. This can be sealed down on the fabric 3 of the preceding layer in the winding.

The layers are arranged to be vulcanized by heat. The vulcanizing material of the vulcanized layer permeates slightly the non-vulcanized stock and forms a complete union between these two layers so that there is a unitary mass, raw on one surface and vulcanized on the opposite surface. The supporting fabric is permanently secured to the vulcanized layer by this vulcanizing process. On the other hand, the fabric 4 is detachably secured to the non-vulcanized layer, the consistency of the face of the non-vulcanized layer not being materially changed by the vulcanizing heat. In the use of the material, the fabric 4 is removed and thus exposes the raw stock which can be readily attached to a tube or other part which is to be repaired. The fabric 4 tends to retain its freshness especially if it is a glazed fabric. It will be readily seen that this article readily lends itself to a process of manufacture which can be carried out with great rapidity and the process of manufacture results in a very superior article.

What I claim as new is:—

1. A tire patch formed of a layer of non-vulcanizing stock; a layer of vulcanizing stock next the layer of non-vulcanizing stock; a facing of fabric on the outer face of the non-vulcanizing layer; and a layer of fabric on the vulcanizing layer, said layers being united by heat as the vulcanizing layer is vulcanized, the fabric on the face of the non-vulcanizing layer being detachably secured to said non-vulcanizing layer and the fabric on the vulcanizing layer being permanently secured to the vulcanizing layer.

2. A tire patch formed of a layer of non-vulcanizing stock; a layer of vulcanizing stock next the layer of non-vulcanizing stock; a facing of glazed fabric on the outer face of the non-vulcanizing layer; and a layer of fabric on the vulcanizing layer, said layers being united by heat as the vulcanizing layer is vulcanized, the fabric on the face of the non-vulcanizing layer being detachably secured to said non-vulcanizing layer and the fabric on the vulcanizing layer being permanantly secured to the vulcanizing layer.

3. The process of forming tire patches which consists in placing in contact a fabric; a layer of non-vulcanizing rubber; a layer of vulcanizing rubber; and a fabric, in the order named; winding the same on an interior support; subjecting the same to a vulcanizing heat, vulcanizing the vulcanizing layer; and sealing the edge of the winding by cutting back the fabric next the non-vulcanizing layer so that said non-vulcanizing layer will adhere to the preceding layer of the winding.

In testimony whereof I have hereunto set my hand.

JOSEPH G. MOOMY.